United States Patent
Fan

(10) Patent No.: US 6,360,083 B1
(45) Date of Patent: Mar. 19, 2002

(54) CLAMPING/HOLDING DEVICE

(76) Inventor: Eagle Fan, No. 30, Lu-Chang, Chupei City, Hsinchu Hsien (TW)

( * ) Notice: Subject to any disclaimer, the term of this patent is extended or adjusted under 35 U.S.C. 154(b) by 0 days.

(21) Appl. No.: 09/339,967

(22) Filed: Jun. 25, 1999

(51) Int. Cl.[7] ................................................. H04B 1/16
(52) U.S. Cl. ............................ 455/90; 455/95; 455/575
(58) Field of Search ............................ 455/90, 95, 99, 455/414, 575

(56) References Cited

U.S. PATENT DOCUMENTS

| | | | |
|---|---|---|---|
| 5,038,400 A | * 8/1991 | Bacarat et al. | 455/90 |
| 5,659,887 A | * 8/1997 | Ooe | 455/575 |
| 5,825,874 A | * 10/1998 | Humphreys et al. | 455/575 |
| 5,836,563 A | * 11/1998 | Hsin-Yung | 455/90 |
| 6,138,041 A | * 10/2000 | Yahia | 455/569 |

* cited by examiner

Primary Examiner—Daniel Hunter
Assistant Examiner—Thuan T. Nguyen

(57) ABSTRACT

A clamping/holding device for a mobile phone includes a main clamping device, an extension set and a speaker clamping set. The main clamping device has a main body with a stationary clamping part on one side and a moveable clamping part on the other side. A moveable part attached to the moveable clamping part has a saw-tooth portion and a notch with a spring coupled to the main body. A hooking part affixed on the main body is normally engaged with the saw-tooth portion to fix the moveable clamping part. A level having a longitudinal slot coupled to a convex extension of the hooking part is used to release the moveable part from the saw-tooth portion. The extension set is connected to the main clamping device by means of an extendable rod. A sound collector is attached on a rotatable link of the extension set.

7 Claims, 11 Drawing Sheets

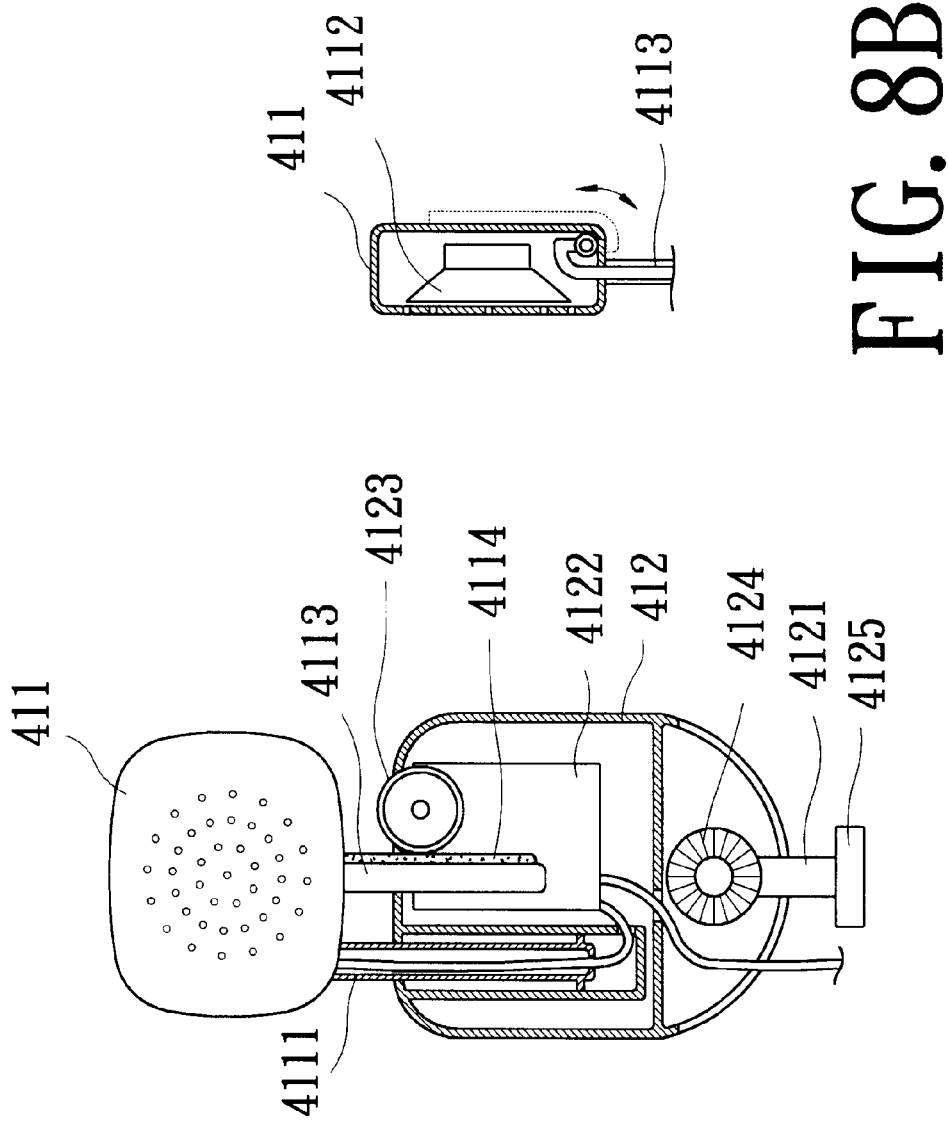

CLAMPING/HOLDING DEVICE

FIELD OF THE INVENTION

The invention pertains to a clamping/holding device, and more particularly, to a mobile phone holding device comprising a component that can move to a desired position promptly.

BACKGROUND OF THE INVENTION

Generally, the clamping/holding device is required to provide two basic functions: 1) one of its components can move along a short distance promptly, 2) when reaching a desired position, this component will be held or clamped still so that it will not move freely. Such clamping/holding devices can be widely found in mobile phone holding apparatus. FIG. 1 shows a basic mobile phone holding apparatus in accordance with the prior invention. As shown in FIG. 1, the conventional mobile phone holding apparatus comprises a horizontally moveable clamping part 10 and a stationary clamping part 11. A mobile phone can be held between these two clamping parts. Beneath the clamping part 10, there is a base body 12 and a spring 13 is attached to one end thereof. On one side of the base body 12, there are teeth-like extensions 14. A hook 15 can be placed between two teeth-like extensions 14 firmly by a spring 16 attached to one end thereof. In operation, to open the holding apparatus, one can separate the hook 15 from the teeth-like extensions 14 by pressing a level 17. As a result, the clamping part 10 would be moved by the spring 13. After placing a mobile phone between the clamping parts 10 and 11, the clamping part 10 can be moved back to hold the mobile phone. In the mean time, the hook 15 can be secured between two teeth-like extensions due to the elastic force exerted by the spring 16 so that the clamping part 10 will not move arbitrarily, so as to hold the mobile phone still. However, such a mobile phone holding device is very complicated and requires many components so that it in turns creates production and assembling problems. As a result, high production cost is required. Based on the findings of the aforementioned drawbacks, it is therefore desirable to introduce a simplified clamping/holding apparatus which can be easily manufactured and requires lower production cost.

SUMMARY OF THE INVENTION

Currently, demand of mobile phone clamping/holding device has increased drastically. To overcome the aforementioned drawbacks, it is the main object to provide a simplified clamping/holding device, which can be assembled easily. The clamping/holding device in accordance with the present invention comprises an elastic clamping part which is formed with the main body integrally. Since no extra clamping component is necessary, the number of components can be reduced and the assembly task is simplified.

It is another object to provide a clamping/holding structure that can be widely used in various applications such as accessories of mobile phones, which include clamp, extending components, and holding base.

It is still an object to provide a clamping/holding device to be used with a mobile phone so that the overall phone system requires no earphone. In accordance with the present invention, the overall phone system can provide good sound quality even without an earphone.

In a summary, the clamping/holding device in accordance with the present invention has a simplified structure so that it requires lower production and less assembling task. Since it is easier and cheaper to be manufactured, the clamping/holding device in accordance with the present invention has more practical and competitive value. Further, in accordance with the present invention, the product would become user-friendlier.

These and other objects and advantages of the present invention will become more apparent from a consideration of the following detailed description of a preferred embodiment thereof, when read in conjunction with the accompanying drawings, wherein:

BRIEF DESCRIPTION OF THE DRAWINGS

FIGS. 8A and 8B show cross-sectional views of the speaker in accordance with the present invention;

DETAILED DESCRIPTION OF THE PREFERRED EMBODIMENT

Figure 1:
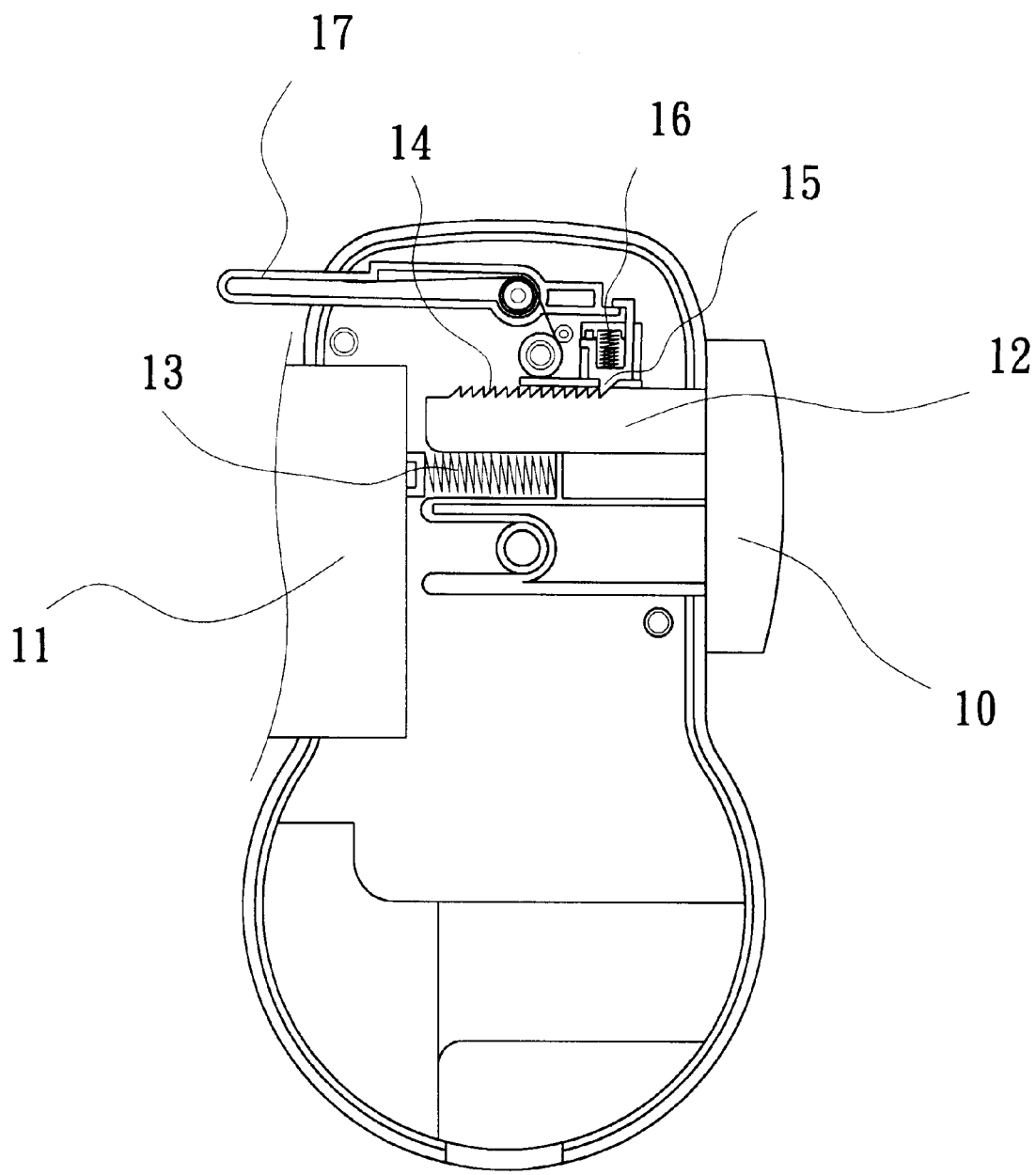
FIG. 1 illustrates a basic clamping/holding device in accordance with the prior invention.
Figure 2A:
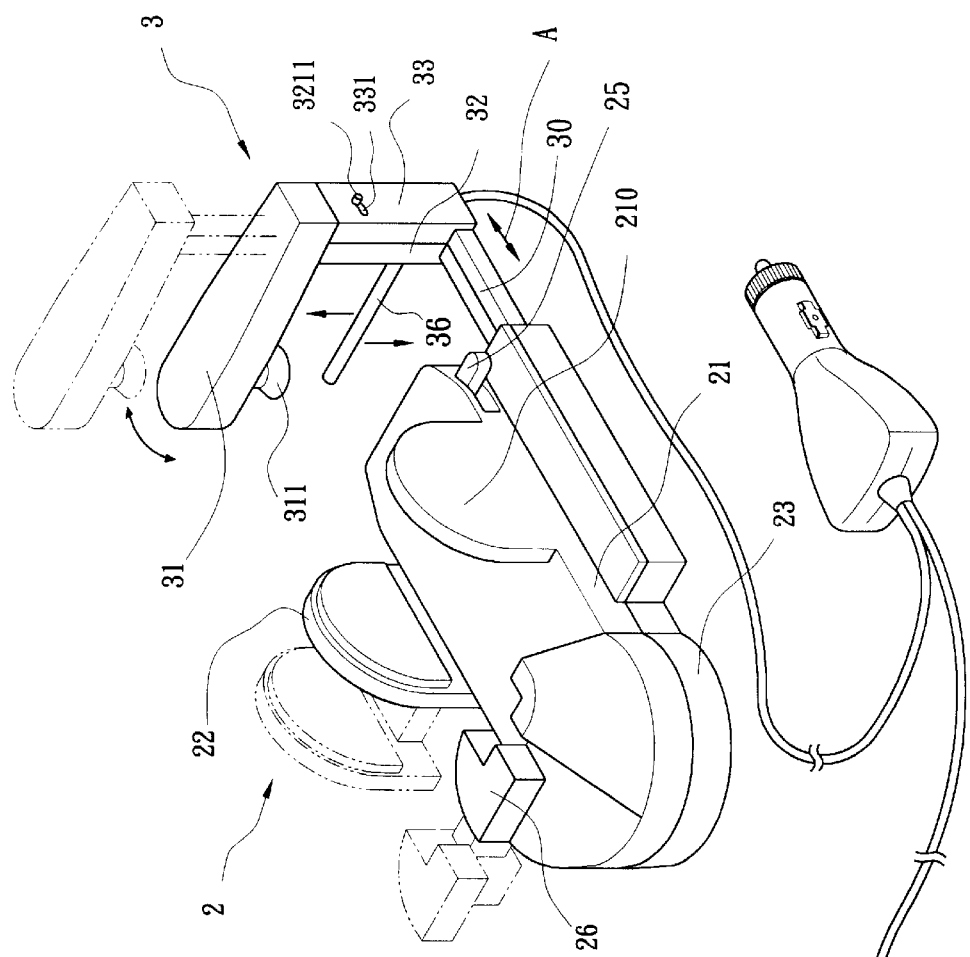
FIG. 2 depicts the overall embodiment in accordance with the present invention.
Figure 2B:
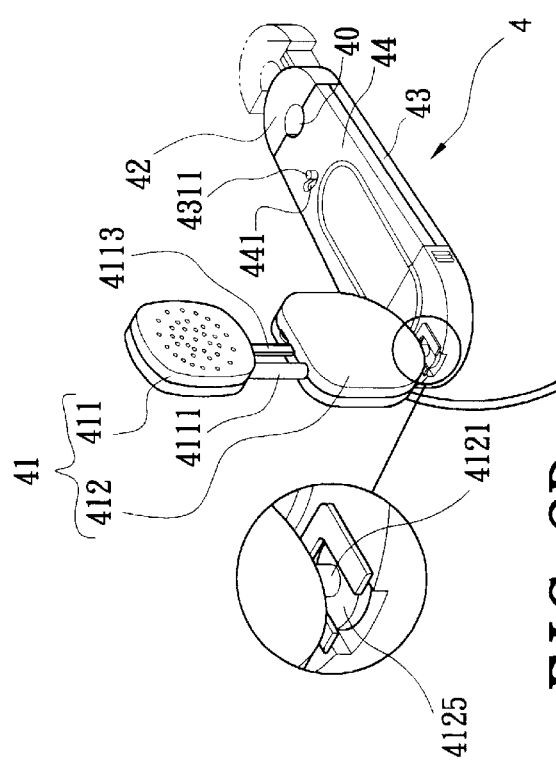

First referring to FIG. 2, there is shown an overall mobile phone system without an earphone. As shown in FIG. 2, the overall earphone free mobile phone system comprises a clamping set 2, an extension set 3, and a speaker clamping set 4. The clamping/holding device in accordance with the present invention can be applied in the aforementioned components. When adopted in the clamping set 2, the clamping/holding device in accordance with the present invention is used to hold the mobile phone. Such a clamping/holding device comprises a stationary clamping part 210 and a moveable clamping part 22. The mobile phone can be held still between the clamping parts 210 and 22. The extension set 3 is coupled to the clamping set 2 on one end thereof. On the top of the extension component, there is a rotatable linking part 31 which has a sound collector 311 used to collect the sound from the speaker of the mobile phone. On the other hand, the speaker clamping part 4 has a speaker unit 41 on one end, and adjustable clamping arch 42 which can be used to attach the speaker clamping part to the seat. Moreover, the vocal signals can be amplified by the speaker unit 41 in accordance with the present invention. In the embodiment illustrated, the mobile phone is held by the clamping set 2 and the vocal signals generated by the mobile phone are collected by the sound collector 311. Further, the vocal signals collected by the sound collector 311 will be amplified by the speaker unit 41 on the speaker clamping set 4. As a result, such an embodiment in accordance with the present invention constitutes a hand-free mobile phone system which can be used in a car.

In the clamping set 2, the extension set 3, and the speaker clamping part, there is a clamping/holding apparatus individually. Although such clamping/hold devices are partially different, they basically perform two common functions:

1). One component of each clamping/holding device can move along a short distance promptly.
2). When reaching a desired position, this component is held still by a clamp, a hook, or the like so that it can not move freely.

Figure 3A:
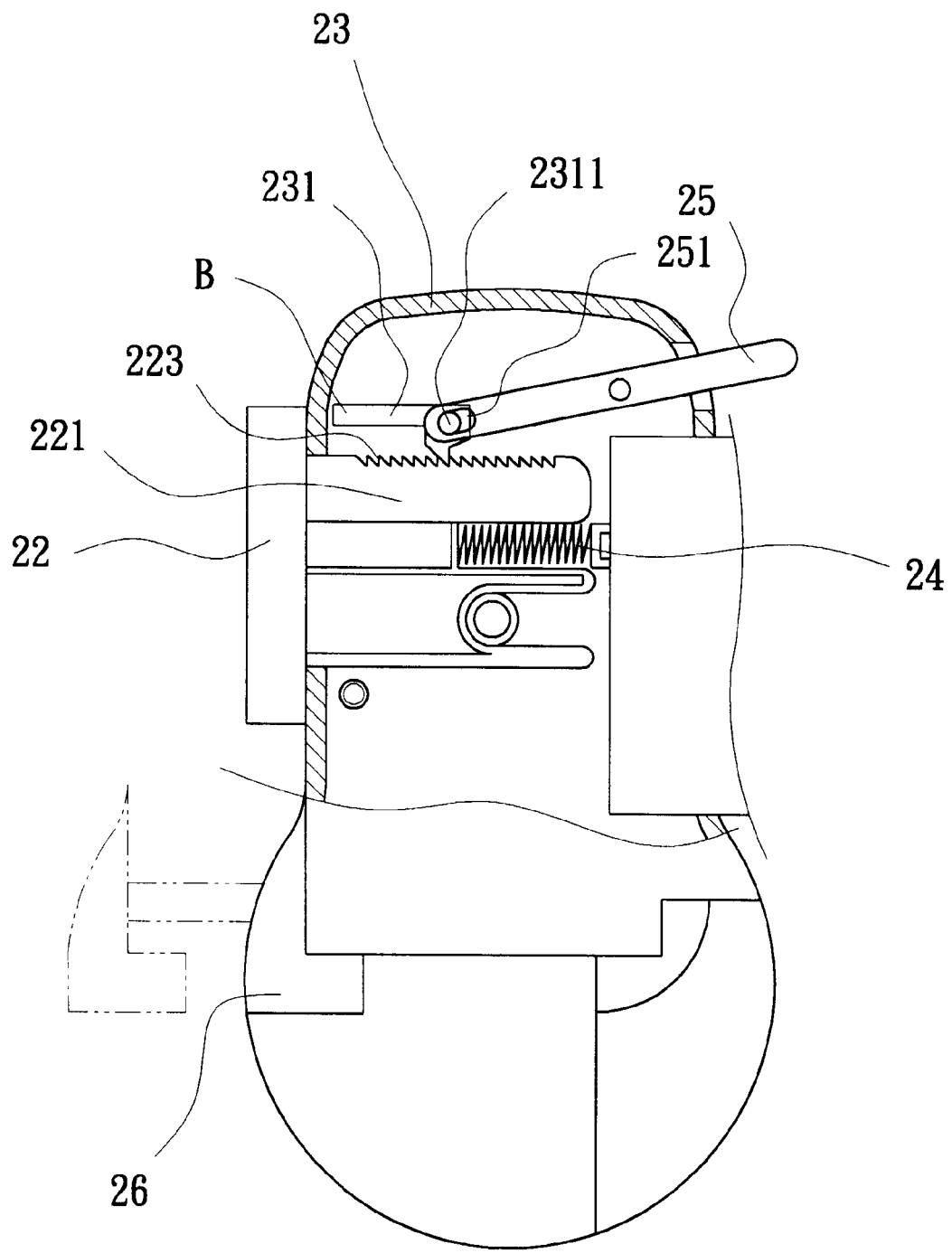
FIGS. 3A and 3B show a cross-sectional view of the clamping part in accordance with the present invention.
Figure 3B:
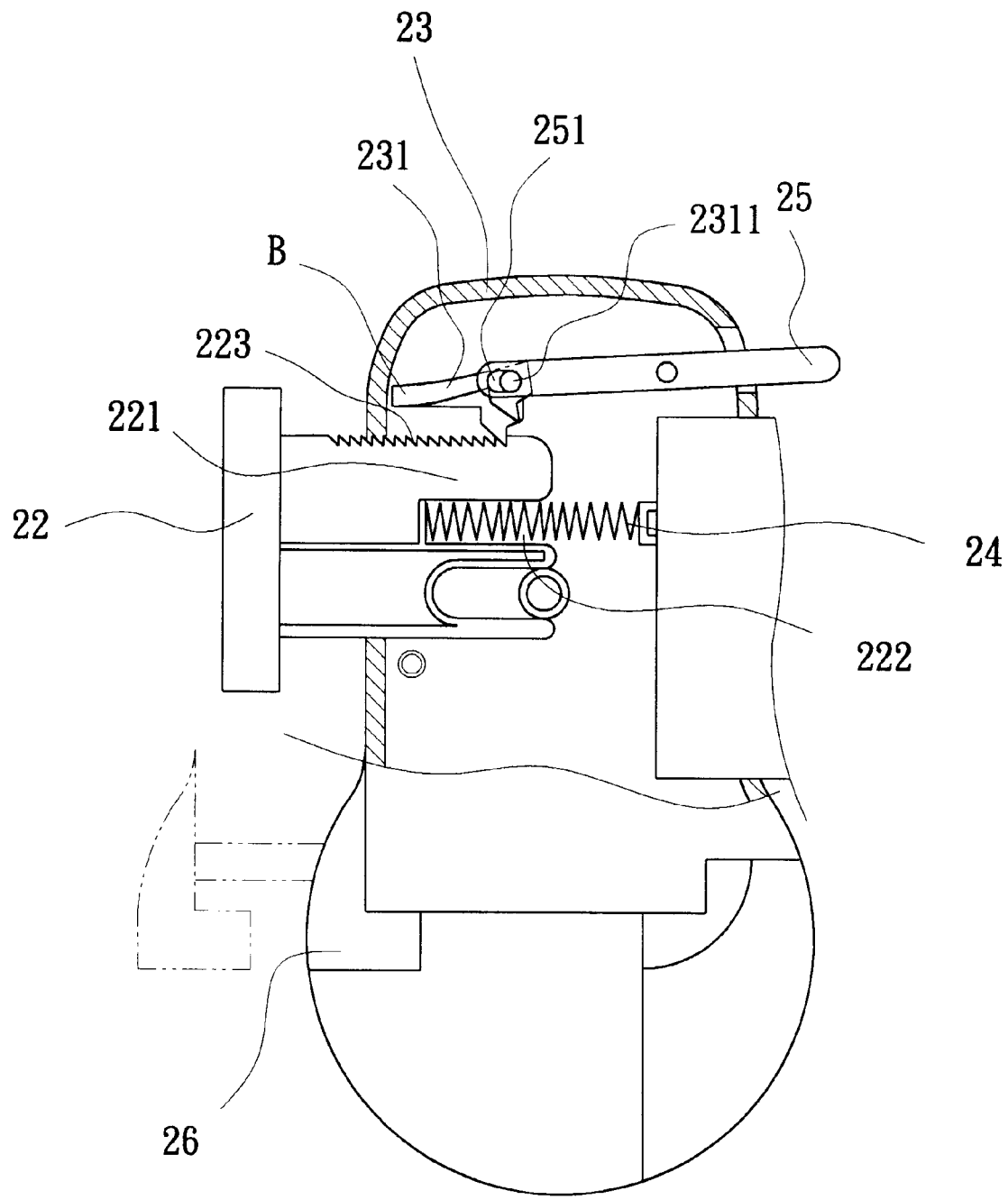
Figure 6:
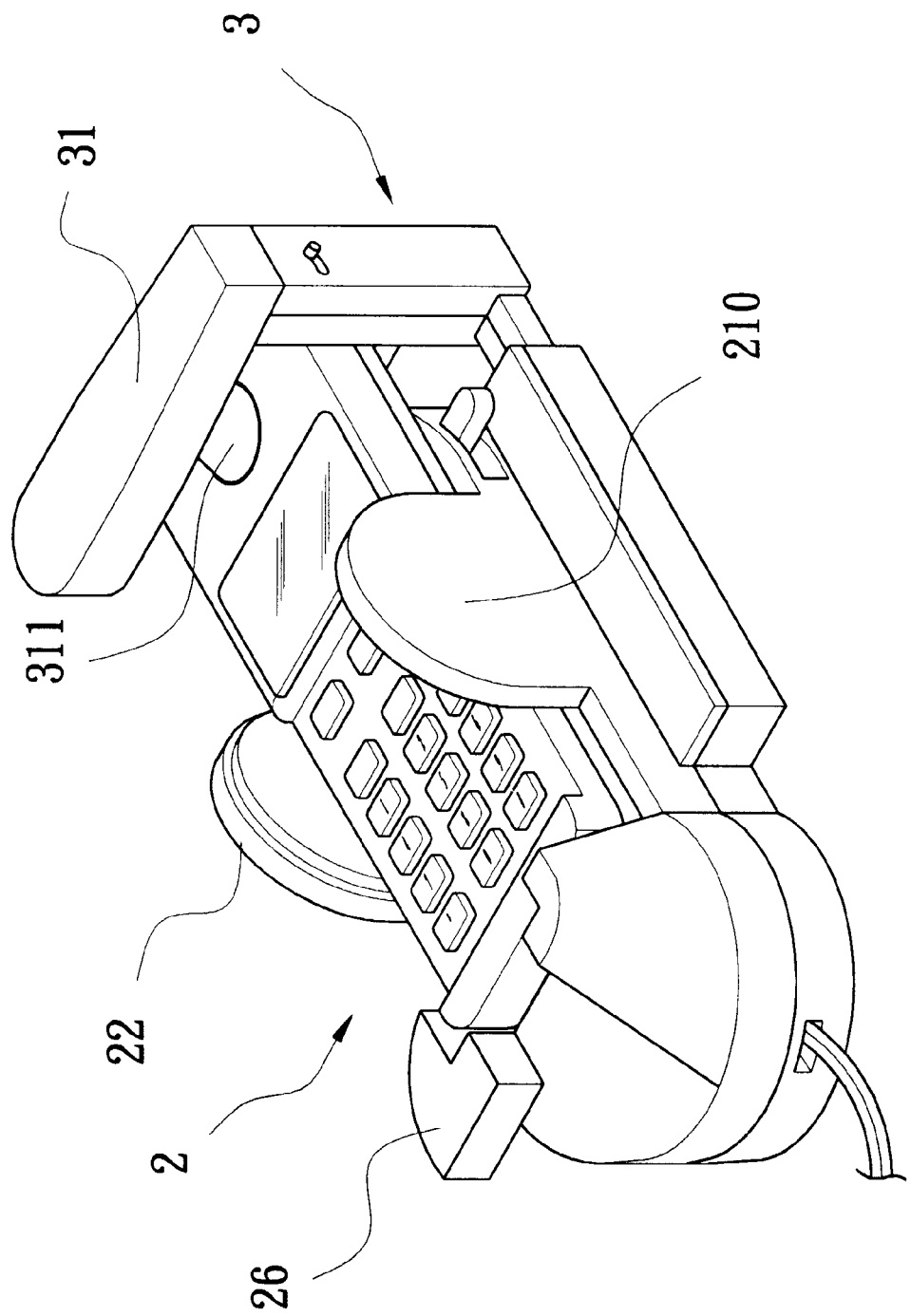
FIG. 6 depicts the first embodiment of the clamping part in accordance with the present invention.
Figure 7:
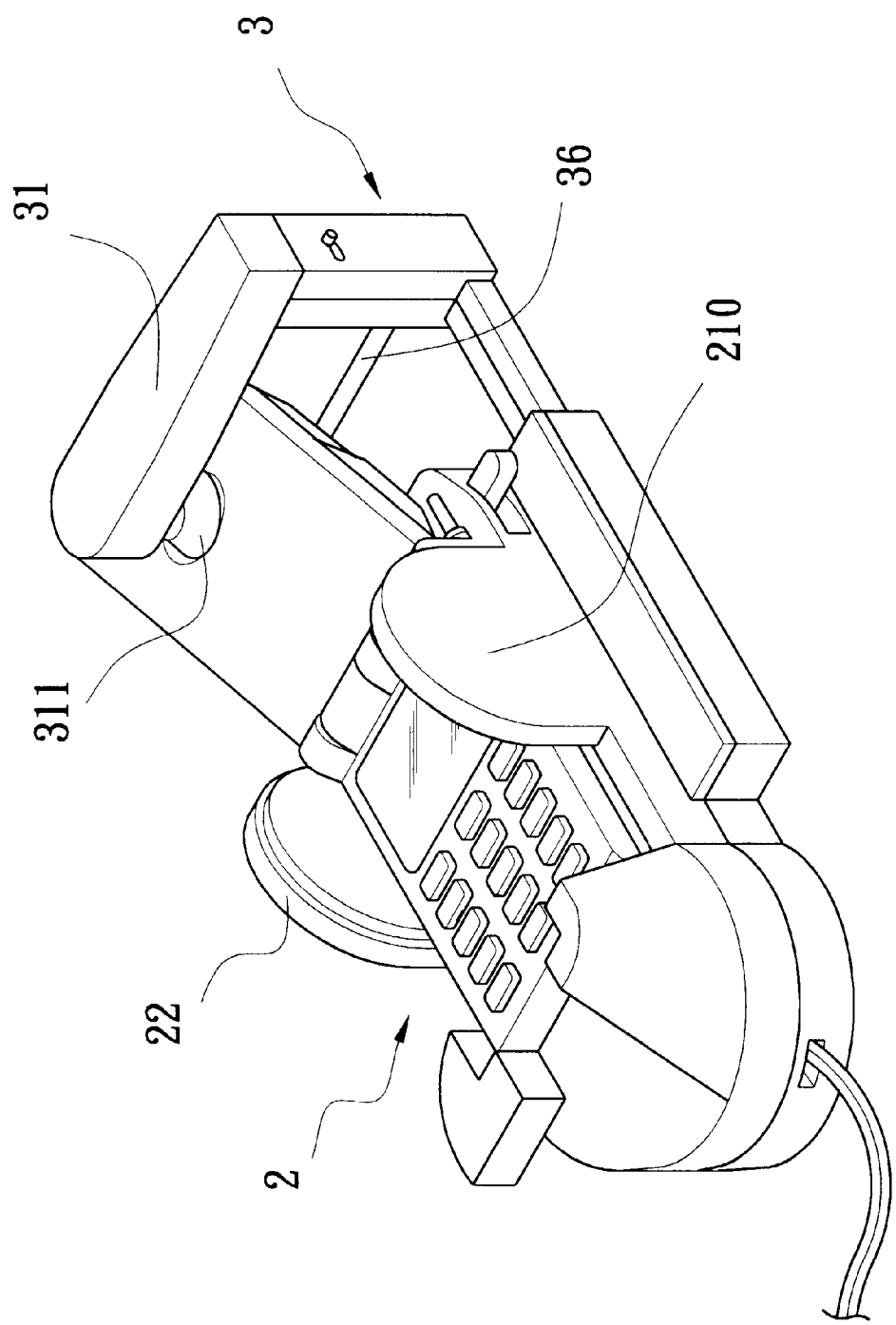
FIG. 7 depicts the second embodiment of the clamping part in accordance with the present invention.
Figures 9A, 9B:
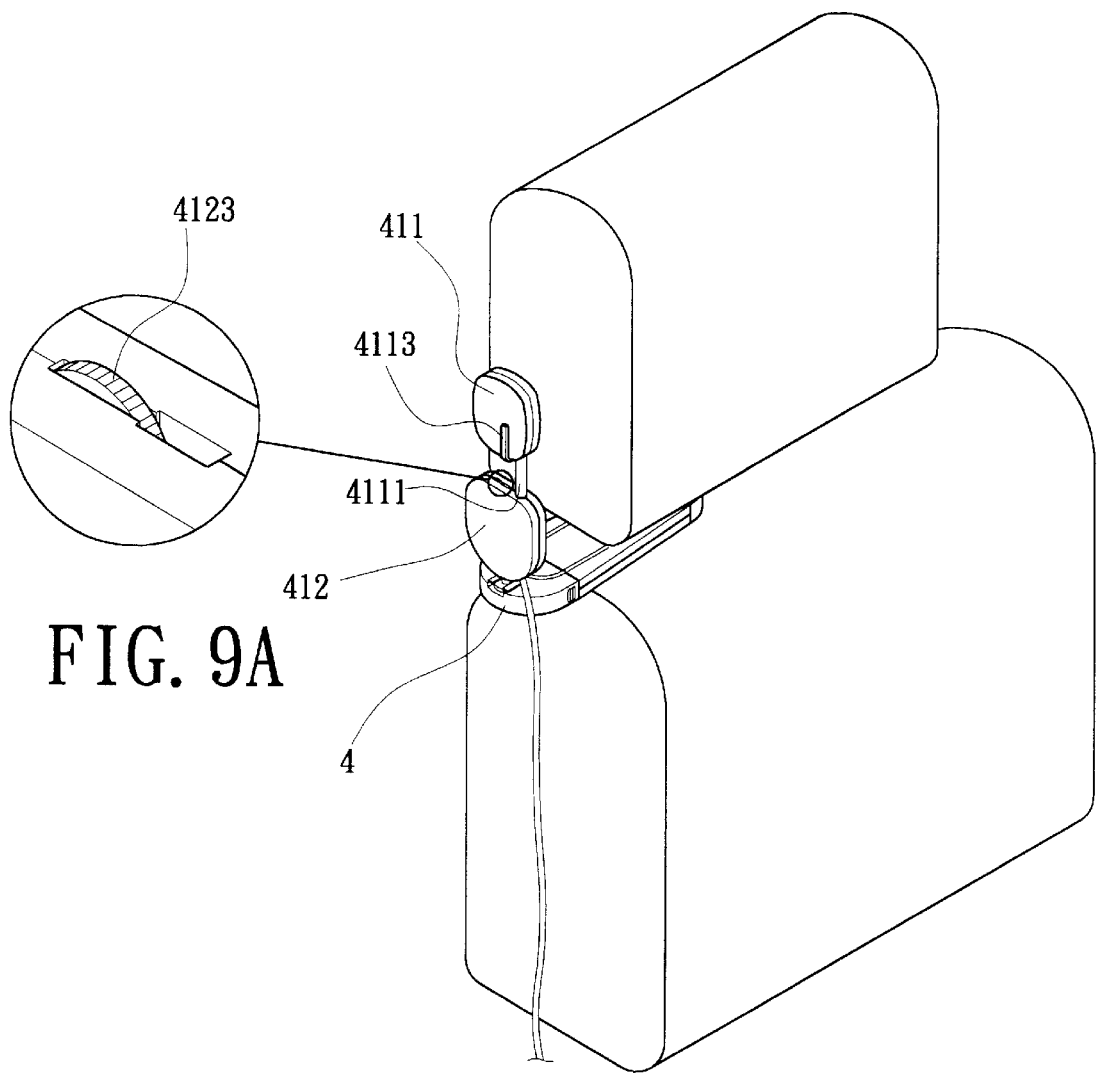
FIG. 9 depicts the first embodiment of the speaker in accordance with the present invention.
Figure 10:
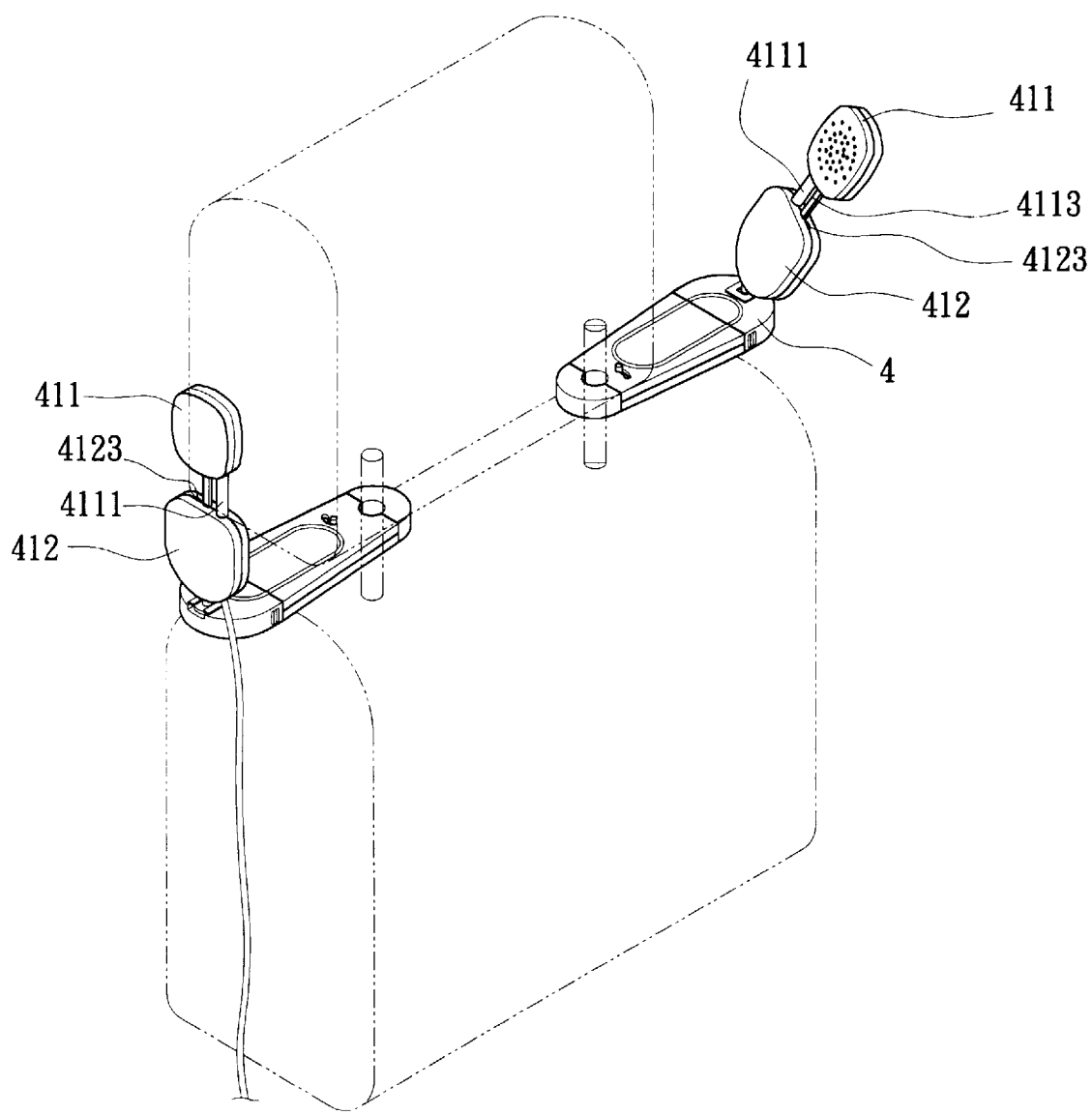
FIG. 10 depicts the other embodiment of the speaker in accordance with the present invention.

Referring to FIG. 2 and FIG. 3, in the embodiment illustrated, the clamping set 2 comprises the stationary clamping part 210 and the moveable clamping part 22 which can move horizontally. In accordance with the present invention, the clamping part 22 has an L-shaped structure. Further, there is a moveable part 221 installed inside the clamping set 2 so that the part 221 is constrained thereby and can only move along a short distance horizontally. As shown in FIG. 3A and FIG. 3B, the clamping set 2 further comprises a notch 222 with a spring 24 attached to it so that the moveable clamping part 22 can move due to the elastic force exerted by the spring 24. On one side of the moveable part 221, there are teeth-like extensions 223. A hooking part 231 is attached to the main component 23 through the connection at B so that they can be manufactured integrally. In operation, the hooking part 231 is secured between two teeth-like extensions so that the moveable part 221 can only move along one direction. A level 25 is coupling to the clamping component and extends outside. On one end of the level 25, there is a longitudinal slot 251 where a convex extension 2311 is inserted. As shown in FIGS. 2 and 3, to open the clamping set 2, one can press the level 25 to separate the hooking part 231 from the teethlike extensions 223 so that the moveable part 221 will move along due to the elastic force exerted by the spring 24. Hence, the mobile phone can be placed between two clamping parts 22 and 210. After placing the mobile phone, one can push the moveable part back and the hooking part 231 can be appropriately secured between two teeth-like extensions 223 to constrain the moveable clamping part 22. FIGS. 6 and 7 depict the pictorial description of operating the clamping set 2.

Figure 4:
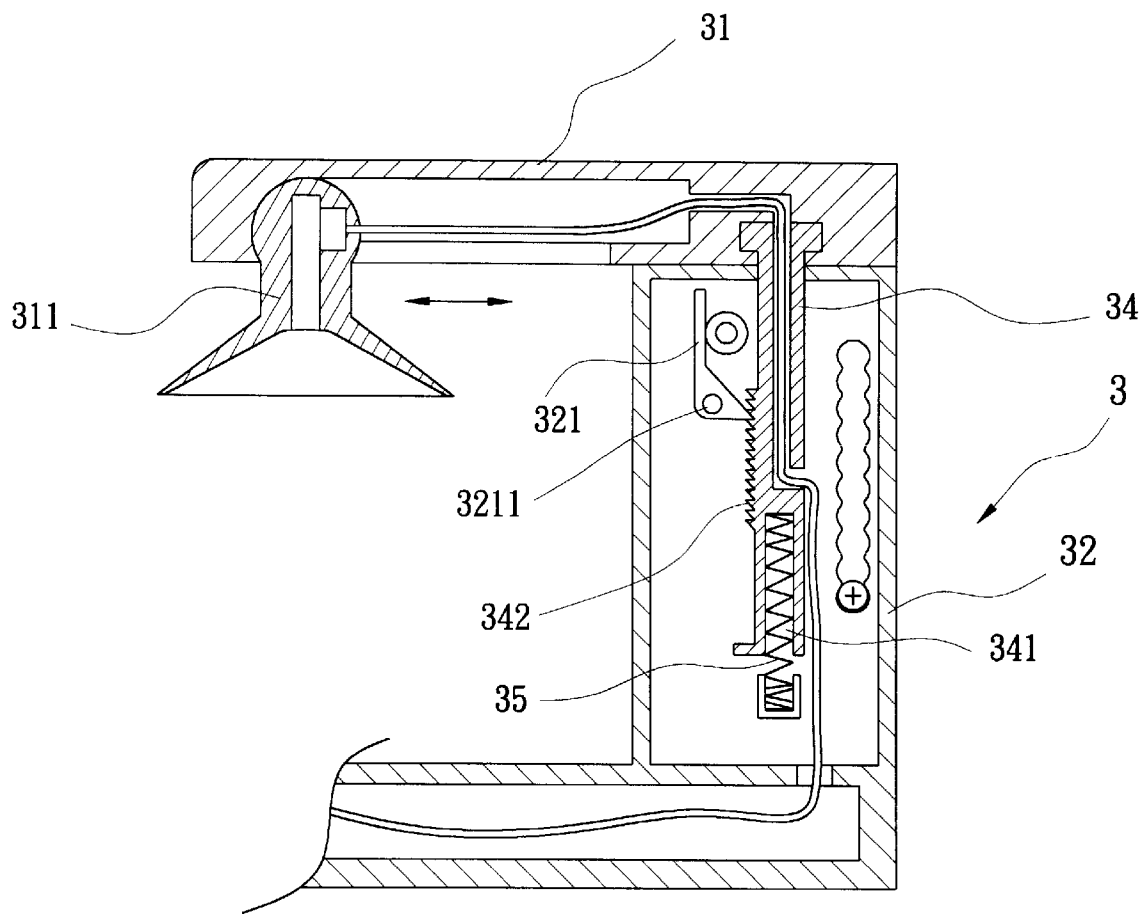
FIG. 4 depicts a cross-sectional view of the extension part in accordance with the present invention.

FIG. 2 depicts how to operate the extension set 3. The extension set 3 is coupling to one side of the clamping component 2 by a rod 30. By adjusting the rod 30, the position of the extension set 3 can be correspondingly adjusted to work with different mobile phones. The extension set 3 comprises a main body 32 and a component 33. As shown in FIG. 4, the extension set 3 further comprises a moveable part 34, which is pivoted to the linking part 31. Through rotating the linking part 31, one can change the position of the sound collector 311 so that the sound collector can be appropriately positioned to work with different mobile phones. On one end of the moveable part 34, there is a notch 341 to which a spring 35 is attached. A hooking part 321 is inside the extension set 3 and is manufactured with the main body 32 integrally. Further, on the hooking part 321, there is an extended rod 3211 extending outside through a curved slot 331 on the component 33 as shown in FIG. 2. In operation, the hooking part 321 is constrained between teeth-like extensions 342 on the moveable part 34. When a mobile phone is held by the clamping set 2, the position of the sound collector 311 can be adjusted by rotating the linking part 31 and adjusting the moveable part 34 so that the sound collector can be appropriately positioned above the speaker of the mobile phone. Since the hooking part 321 is securely constrained by the teeth-like extensions 342, the hooking part can not move freely. To release the mobile phone, one can press the extended rod 3211 to separate the hooking part 321 from the teeth-like extensions 342. Hence, the moveable part would move upward due to the elastic force exerted by the spring 35 so that the sound collector would move away from the mobile phone and one can pick up the mobile phone.

Figure 5:
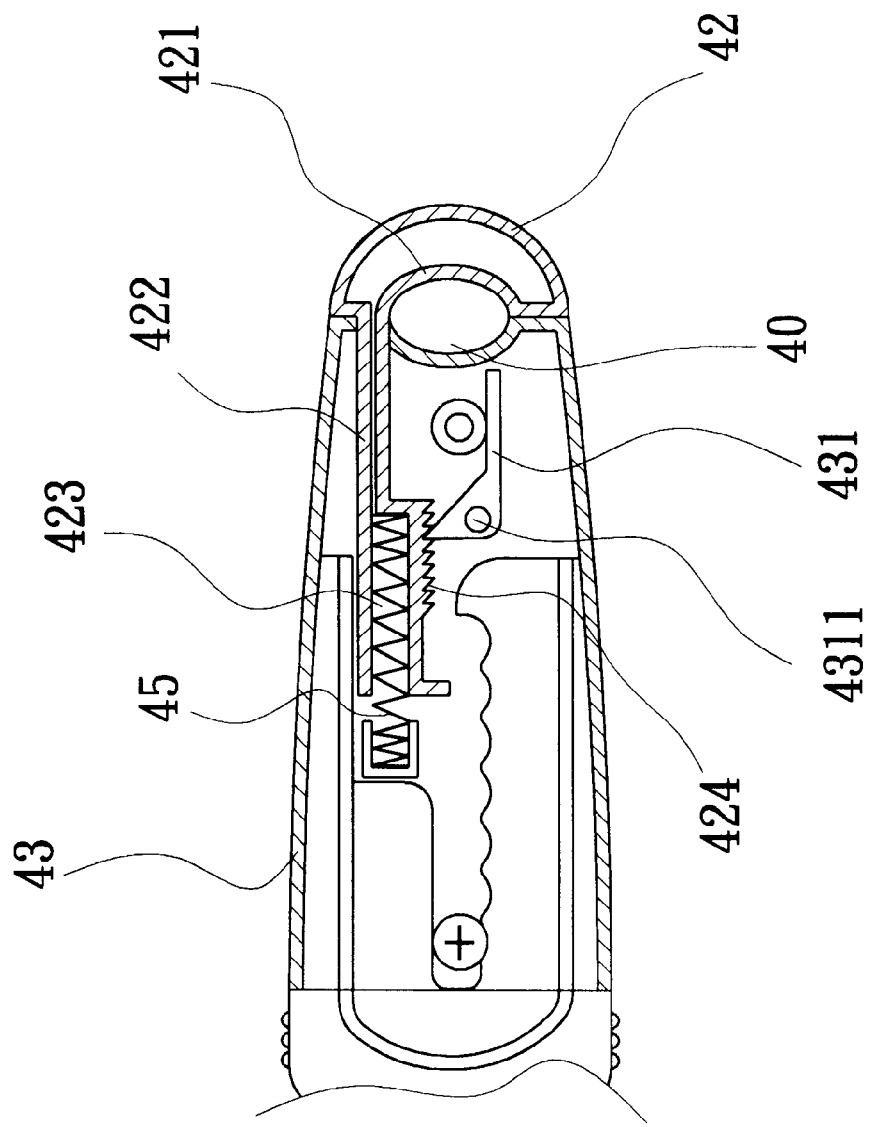
FIG. 5 depicts a cross-sectional view of the speaker-clamping base in accordance with the present invention.

Referring to FIG. 2, the speaker clamping set 4 comprising the speaker unit 41 is usually attached to the head resting part of the seat of a car. Basically, the main component of the speaker clamping set 4 comprises a main body 43 and a component 44. On one end of the main body 43, there is a curved opening 40 and a clamping arch 42 which can be used to attach the speaker clamping set 4 to the seat. Refer to FIG. 5 to specifically realize the operation of the speaker clamping set 4. The inner side 421 of the clamping arch 42 is of a shape of a half circle. Incorporated with the opening 40, there is a moveable part 422 coupling to the clamping arch 42. Further, on one end of the moveable part 422, there is a notch 423 to which a spring 45 is attached. Similarly, there are teeth-like extensions 424 on the moveable part 422. A hooking part 431 is similarly manufactured with the main body 43 integrally. On the hooking part, there is also an extended rod 4311 extending outside through a curved slot 441 on the component 44 as shown in FIG. 2. When operating, one can press the extended rod 4311 to separate the hooking part 431 from the teeth-like extensions 424 so that the moveable part 422 can move along due to the elastic force exerted by the spring 45. As a result, the clamping arch is moved outward so that the opening 40 is opened so that one can detach the speaker clamping set 4 from the seat. To attach the speaker clamping set 4 to the seat, one can simply press the clamping arch back.

In addition to the basic elements of each component, as shown in FIG. 2, the clamping set is also equipped with an auxiliary clamping part 26 so that when the moveable clamping part 22 is opened, the mobile phone can still be secured in the clamping set 2. Similarly, the extension set 3 is equipped with an auxiliary clamping rod 36 to support the cover of the mobile phone as shown in FIG. 2. The sound collector is of a curved shape in order to have a better sound-collecting feature.

To obtain an overall phone system without an earphone, the speaker clamping set 4 further comprises the speaker unit 41 as shown in FIG. 2. The speaker unit 41 basically comprises a speaker base 411 and a main body 412. The speaker base 411 is attached to the main body through a link 4111 and it can move upward and downward in a short distance. Refer to FIGS. 8A and 8B for detailed description. Inside the base 411, there are speaker 4112, the link 4111 and a level 4113. The speaker 4112 and the link 4111 are fixed to the speaker base inside and on the bottom, respectively. The level 4113 is pivoted and is rotatable. On one side of the level 4113, there is a sponge 4114 or other soft materials to rotate a button 4123. Inside the main body 412, there is a circuit board 4122 and the adjusting button 4123 which can be used to adjust the volume of the speaker 4112. Part of the adjusting button is placed outside the speaker clamping set 4 in order for users to adjust the volume of the speaker. On the other hand, the main body 412 has a linking part 4121 coupled to the bottom thereof. The main body 412 and the linking part 4121 are coupled by the teeth-like element 4124 so that the angle of the main body 412 can be adjusted. In addition, the linking part 4121 has a disc 4125 on the bottom thereof which is pivoted to the speaker clamping set 4. As a result, the main body can rotate freely.

In the embodiment illustrated:
1. When serving as a speaker, the level 4113 is in its upward position and the user can adjust the volume of the speaker by rotating the adjusting button 4123. Also, the user can rotate the main body to obtain an appropriate position.

2. When serving as an earphone, the speaker base is pulled up and the level 4113 is pressed downward so that one side thereof contacts with the adjusting button 4123. Similarly, one can rotate the main body so that the speaker is close to the ear of the user. To adjust the volume of the speaker is also done by rotating the adjusting button.

Although the preferred embodiment has been described to illustrate the present invention, it is apparent that changes and modifications in the specifically described embodiment can be carried out without departing from the scope of the present invention. Such modifications and changes should be considered within the scope of the present invention limited by the appended claims.

What is claimed is:

1. A clamping/holding device for a mobile phone, comprising:
   a main body;
   a clamping set including a stationary clamping part on a first side of said main body and a moveable clamping part on a second side of said main body;
   a moveable member affixed to said moveable clamping part, said moveable member having a saw-tooth portion and a notch with a spring attached thereon, said spring coupling said moveable member to said main body;
   a level attached to said main body, said level having a longitudinal slot; and
   a hooking member attached to said main body, said hooking member having a convex extension extended through said longitudinal slot for coupling with said level;
   wherein said hooking member is normally engaged with said saw-tooth portion to fix said moveable clamping part, and is released from said saw-tooth portion for moving said moveable clamping part when said level is pressed.

2. The clamping/holding device as claimed in claim 1 further having an auxiliary clamping part attached to said main body.

3. The clamping/holding device as claimed in claim 1 further having an extension set comprising:
   an extension body;
   an extendable rod connecting said extension body to said main body;
   a rotatable linking part having a sound collector affixed thereon;
   a moveable part having a saw-tooth portion, and a notch with a spring attached thereon for coupling said moveable part to said extension body, said moveable part being pivoted to said rotatable linking part; and
   a hooking element attached to said extension body, said hooking element being normally engaged with said saw-tooth portion of said moveable part to fix said rotatable linking part;
   wherein said hooking element can be released from said saw-tooth portion of said moveable part by pushing an extended portion on said hooking element.

4. The clamping/holding device as claimed in claim 3 further having an auxiliary clamping rod attached to said extension body.

5. The clamping/holding device as claimed in claim 3 further having a speaker clamping set comprising:
   a speaker clamping body having a curved opening;
   a clamping arch, said curved opening and said clamping arch together forming a substantially circular opening;
   a moveable element attached to said clamping arch, said moveable element having a saw-tooth portion, and a notch with a spring attached thereon for coupling said moveable element to said speaker clamping body; and
   a hooking component attached to said speaker clamping body, said hooking component being normally engaged with said saw-tooth portion of said moveable element to fix said clamping arch;
   wherein said hooking component can be released from said saw-tooth portion of said moveable element by pushing an extended portion on said hooking component.

6. The clamping/holding device as claimed in claim 5 further having a speaker unit attached to said speaker clamping set, said speaker unit including a speaker, a speaker base, and a speaker unit body, said speaker base being coupled to said speaker unit body by a linking member.

7. The clamping/holding device as claimed in claim 6, said speaker unit further having a volume control level attached to said speaker base, said volume control level having a sponge or soft material coupled to a volume control button attached within said speaker unit body, wherein the volume of said speaker can be controlled by moving said speaker base up or down.

\* \* \* \* \*